United States Patent [19]

Donoghue

[11] 4,077,547

[45] Mar. 7, 1978

[54] MEASURING AND DISPENSING APPARATUS

[76] Inventor: Robert J. Donoghue, 4 Burnwood Dr., Bloomfield, Conn. 06002

[21] Appl. No.: 654,657

[22] Filed: Feb. 2, 1976

[51] Int. Cl.² .............................................. B65D 37/00
[52] U.S. Cl. ................................................... 222/207
[58] Field of Search ................ 222/94, 158, 207, 211, 222/424.5, 545, 546, 564

[56] References Cited

U.S. PATENT DOCUMENTS

| 2,599,446 | 6/1952 | Greene | 222/207 X |
| 2,628,742 | 2/1953 | Kierulff | 222/158 X |
| 3,094,250 | 6/1963 | Molyneaux et al. | 222/207 |
| 3,921,860 | 11/1975 | Zackheim | 222/207 |

FOREIGN PATENT DOCUMENTS

| 1,395,827 | 3/1965 | France | 222/211 |

Primary Examiner—Robert B. Reeves
Assistant Examiner—Norman L. Stack, Jr.

[57] ABSTRACT

A measuring and dispensing apparatus for use with a flexible-wall container is provided by the combination of a dispensing means having an enlarged cylindrical base portion and an upstanding portion, the upstanding portion having an upper end and a lower end, the lower end disposed on the enlarged base portion, the upstanding portion also having a bore therein and an outlet orifice disposed therein proximate the upper end and in fluid communication with the bore; the enlarged base portion having container engaging means thereon; wall means disposed around the dispensing means and forming, with the enlarged base portion a fluid measuring chamber, the chamber having an upper end having a fluid outlet; and a tube having an inlet end and an outlet end, the tube disposed so that the outlet end is disposed in the bore in the upstanding portion of the dispensing means and in fluid communication therewith, the inlet end adapted to be disposed in the flexible-wall container.

7 Claims, 9 Drawing Figures

U.S. Patent  March 7, 1978  4,077,547
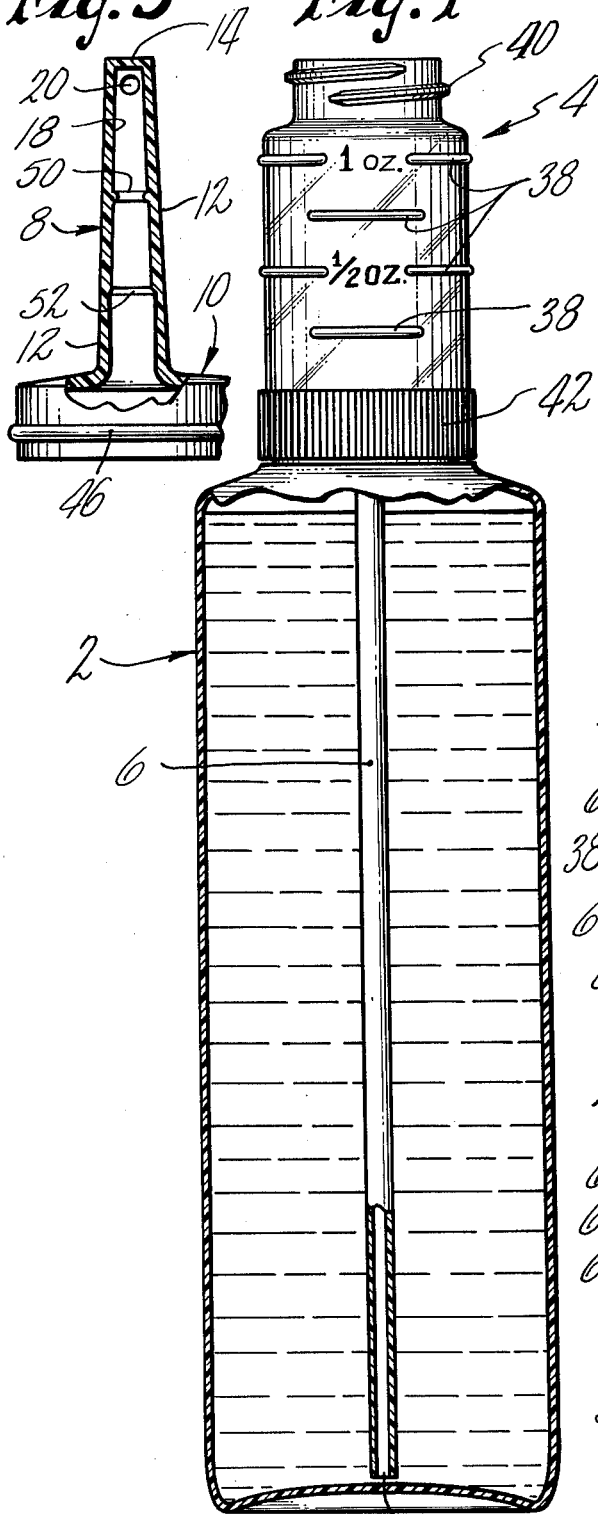
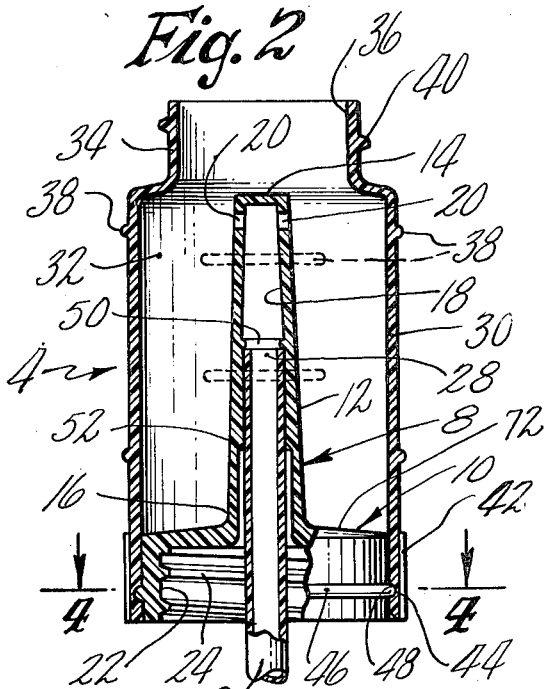
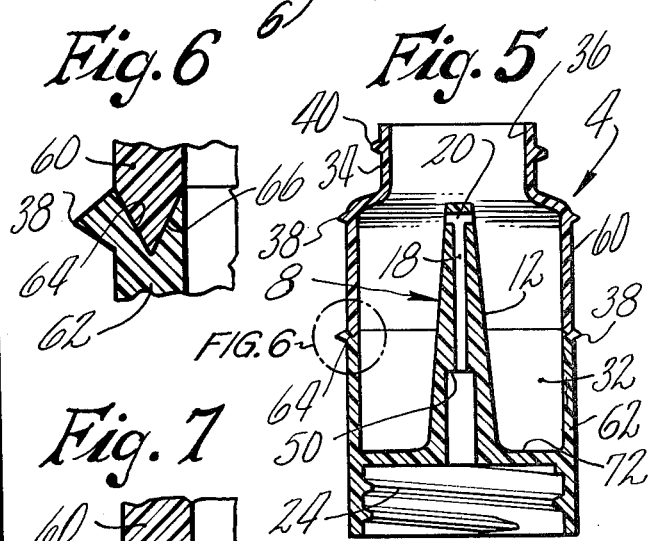
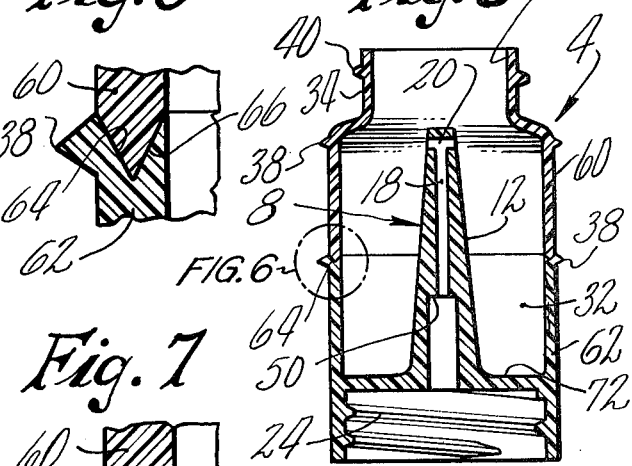
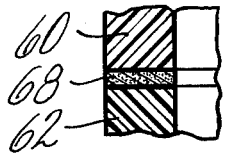
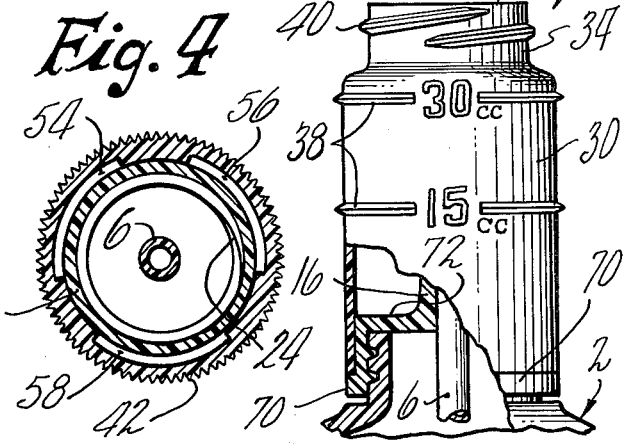
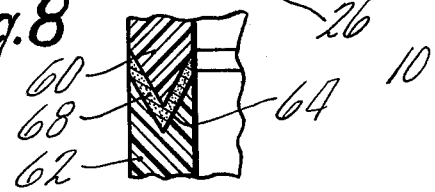

MEASURING AND DISPENSING APPARATUS

BACKGROUND OF THE INVENTION

1. Field of the Invention

This invention relates to the mesuring and dispensing of liquids and particularly to a measuring and dispensing apparatus for utilization with standard type flexible-wall containers.

2. Description of the Prior Art

Dual compartment containers for dispensing measured quantities of liquids have been proposed heretofore; see, for example, U.S. Pat. No. 3,347,420 and No. 3,581,953, both issued to the inventor herein, for possible forms of such a container. While both patents describe certain containers which have been found very useful in storing liquid in a container having a dispensing chamber integrally formed thereon and accurately measuring precise quantities of the liquid, both suffer from some disadvantages. The container described in the first-mentioned patent is, for all practical purposes, not refillable because the means for transferring liquid from the storage chamber to the measuring chamber is not removable. Thus, once the container has been filled with liquid, the transfer means inserted into the container, and the liquid contents of the container used up by the consumer, the container is not refillable or reusable. The second abovementioned patent describes a container in which an attempt was made to make the container refillable by providing the transfer means with male threads and the wall means between the integral storage chamber and the measuring chamber with female threads to receive the transfer means. However, removal of the transfer means requires the use of tools. Furthermore, the transfer means may only be utilized with a specially designed container. The measuring and dispensing apparatus of the present invention overcomes all these difficulties: it is easily removed from any container without the use of tools, the apparatus may be utilized with virtually any flexible-wall container having a standard-type finish and the apparatus may be reused.

SUMMARY OF THE INVENTION

It is the object invention to provide a measuring and dispensing apparatus which may be utilized with virtually any flexible-wall container having a standard-type finish and which may be easily removed from a container without the use of tools.

In accordance with the present invention a measuring and dispensing apparatus for use with a flexible-wall container is provided by the combination of a dispensing means having an enlarged base portion and an upstanding portion, the upstanding portion having an upper end and a lower end, the lower end disposed on the enlarged base portion, the upstanding portion also having a bore therein and an outlet orifice disposed therein proximate the upper end and in fluid communication with the bore; the enlarged base portion having container engaging means thereon; wall means disposed around the dispensing means and forming, with the enlarged base portion, a fluid measuring chamber, the chamber having an upper end having a fluid outlet; and tube means having an inlet end and an outlet end, the tube means disposed such that the outlet end is disposed in the bore in the upstanding portion of the dispensing means and in fluid communication therewith, the inlet end adapted to be disposed in the flexible-wall container.

In further accord with the present invention, sealing means may be disposed between the outer surface of the enlarged base portion and the inner surface of the wall means.

In still further accord with the present invention, the enlarged base portion has first sealing means disposed on the outer surface thereof extending completely around the enlarged base portion and the wall means has second sealing means disposed on the inner surface of the lower end thereof for cooperation with said first sealing means to provide a fluid-tight seal between the inner surface of said wall means and the outer surface of said enlarged base portion In still further accord with the present invention the above-mentioned first and second sealing means may also be fashioned so as to lock the wall means to the enlarged base portion to prevent rotation of the wall means relative to the enlarged base portion.

The foregoing and other objects, and advantages of the present invention will become more apparent in light of the following detailed description of a preferred embodiment thereof, as illustrated in the accompanying drawings.

BRIEF DESCRIPTION OF THE DRAWINGS

FIG. 1 is a front partially sectioned elevation view of the measuring and dispensing apparatus of the present invention disposed on a flexible-wall container;

FIG. 2 is an enlarged cross sectioned view of one embodiment of the measuring and dispensing apparatus of the present invention;

FIG. 3 is a partial view of the dispensing apparatus showing details of construction;

FIG. 4 is a cross sectioned view taken along line 4—4 of FIG. 2 but showing a slightly different embodiment having a locking feature;

FIG. 5 is a sectioned view of another embodiment of the measuring and dispensing apparatus of the present invention;

FIG. 6 is an enlarged view of the portion indicated by the dotted line in FIG. 5;

FIG. 7 is an enlarged detail view similar to FIG. 6, but showing a different method of construction;

FIG. 8 is an enlarged detail view similar to FIG. 6, but showing still another method of construction; and FIG. 9 is a front elevation view of still another embodiment of the measuring and dispensing apparatus of the invention, partially broken away to reveal certain details of its construction.

DESCRIPTION OF THE PREFERRED EMBODIMENT

Referring to the drawings, wherein like numerals refer to like components, FIG. 1 shows a flexible-wall container 2 having a threaded finish (not shown) at one end. A measuring and dispensing apparatus according to the present inventio, shown generally at 4, is disposed atop the container 2. Tube means 6 extends from the measuring and dispensing apparatus 4 into the container 2.

FIG. 2 shos a presently preferred embdiment of a measuring and dispensing apparatus in accordance with my invention. Dispensing means 8 comprises an enlarged cylindrical base portion 10 and an upstanding portion 12. The upstanding portion 12 has an upper end 14, and a lower end 16, the lower end 16 being disposed on the enlarged base portion 10, and a bore 18 therein. The bore 18 is in fluid communication with an outlet orifice 20 disposed in the upstanding portion 12 proximate the upper end 14. The enlarged base portion 10 has a container engaging bore 22 therein which may be provided with threads 24 adapted for mating with the threads on the finish of the container 2. It will be obvious to those skilled in the art that a thread connection between the container 2 and the enlarged base portion 10 is not the only type of container engaging means which could be employed. For example, the enlarged base portion 10 could have a tapered cylindrical extension from the lower surface thereof in the shape of a stopper type cork, like in a wine bottle, or the wall means 30 could have an elongated lower skirt to frictionally engage the surface of the neck of a container. Other engagements are contemplated. The tube means 6 have an inlet end 26 and an outlet end 28, the outlet end 28 being disposed in the bore 18 of said upstanding portion 12 and in fluid communication therewith and the inlet end 26 being in the container 2 proximate the base thereof wall means 30 is disposed around the dispensing means 8 and forms, with the enlarged base portion 10, a fluid measuring chamber 32 having an upper end 34 having a fluid outlet 36. The upper end 34 may be provided with threads 40 for engaging the threads of a closure cap (not shown). The surface of the wall means 30 may be marked with appropriate gradations 38, as shown best in FIGS. 1 and 9, for measuring the desired amount of liquid from the container 2 into the measuring chamber 32.

The base portion advantageously has a knurled skirt 42 surrounding it to facilitate attaching the apparatus to and removing it from the container. The components making up my measuring and dispensing apparatus are preferably molded from a plastic material. Preferably the wall means is molded from a plastic material which is translucent or transparent, such as polyethylene, polyvinylchloride, polypropylene or polyethylene terephthalate, for example, so that the user can see through the wall means the amount of liquid being measured in to the measuring chamber 32. The material may also be opague and the user would look into the measuring chamber 32 through fluid outlet 36 to see the amount of liquid being measured. In the embodiment shown in FIG. 2, the dispensing means 8 may be a separate piece from the wall means 30 so that the components can be easily and inexpensively fabricated. It is, therefore, desirable to provide sealing means 44 between the outer surface of the enlarged base portion 10 and the inner surface of the wall means 30 to provide a fluid-tight seal therebetween. The sealing means 44 may comprise a ring 46 or the like which extends completely around the circumference of the enlarged base portion 10 and a recess or groove 48 in the wall means 30 for receiving the ring 46 therein in sealing engagement. FIG. 3 shows the upstanding portion 12 in detail. Provisions are made in the bore 18 thereof to accomodate tube means of different diameters. A first stop 50 is provided by making the bore slightly larger than the upper portion of the bore. A second stop for receiving a larger diameter tube means 52 may be provided by making the lowest portion of the bore slightly larger than the intermediate portion of the bore. In this manner a stop for tube means 6 may be provided in upstanding portion 8. As will be obvious to those skilled in the art, the diameters of the bore will be dimensioned to receive the tube means 6 in frictional engagement. It is desirable to provide two stops 50 and 52 so that the measuring and dispensing means may be utilized with liquids of different viscosity. I have found, for example, that the smaller diameter tube means is preferable for liquids having a viscosity like water or alcohol, while the larger diameter tubing is preferable for liquids having a viscosity like shampoo, creme rinse, cough syrup and oils of various types.

FIG. 4 is taken along line 4—4 of FIG. 2. However, it depicts a slightly different embodiment from that shown in FIG. 2. In FIG. 4, the sealing ring 46 does not go completely around the circumference of the enlarged base portion 10. Instead, three separate segments 54, 56 and 58 are provided. These segments engage three separate recesses or grooves in the wall means 30. The segments and grooves serve to prevent rotation of the wall means 30 relative to the enlarged base portion 10 when the measuring and dispensing apparatus is being attached to or removed from the container 2.

FIG. 5 shows another embodiment of my invention in which the wall means is made in two separate pieces 60 and 62. The lower portion 62 of the wall means may be integral with the enlarged base portion 10. The upper portion 60 of the wall means is then attached to the lower portion 62 to form the measuring chamber 32. Various methods may be utilized to attach the upper portion 60 to the lower portion 62, such as adhesive bonding, spin welding or magnetic heat bonding. FIG. 6, for example, shows a method of construction in which the lower section 62 has a V-shaped groove 64 for receiving the mating V-shaped edge of the upper portion 60. The portions may be adhesively bonded or spin welded together at the surfaces of groove 64 and edge 66. FIGS. 7 and 8 show two methods of construction which are similar to that shown in FIG. 6 but especially adapted for magnetic heat bonding. In FIG. 7 a layer of bonding agent 68 is disposed between the upper portion 60 and the lower portion 62. The portions are then bonded together, for example, by the method described in "Modern Packaging," June, 1974, pp 29–33. An alternative construction for magnetic heat bonding is shown in FIG. 8. The V-shaped notch or groove 64 in the lower portion 62 receives the mating V-shaped edge 68 of upper portion 60. A bonding agent 68 is disposed therebetween and the two pieces are then bonded together.

FIG. 9 shows still another embodiment of a measuring and dispensing apparatus in accordance with my invention. In this embodiment, the enlarged base portion 10 has a shoulder 70 around its outer circumference. The lower edge of the wall means 30 abuts the shoulder; the shoulder serves to positively locate the gradations 38 on the wall means 30 with respect to the upper surface 72 of the enlarged base portion 10 and the orifice 20 in the upstanding portion 12 so that the measuring chamber 32 will accurately measure the volume of liquid therein as indicated by the gradations 38.

In operation (which is identical in all embodiments of my invention), the measuring and dispensing apparatus 4 is attached to the top of the flexible-wall container 2. The tube 6 is of a length sufficient to reach from its upper end in the upstanding portion 12 to a point proximate the base of the container. The user squeezes the walls of the container, and liquid is displaced therefrom through the tube 6 and the bore 18 in upstanding portion 12, out the outlet orifice 20 and into the measuring chamber 32. When the user releases the pressure being applied to the flexible walls of the container 2, the liquid flow will cease. Thus, the user is able to accurately dispense the desired amount of liquid from the container 2 into the measuring chamber 32. It will be understood by those skilled in the art that if the volume of liquid dispensed from the container 2 into the measuring chamber 32 is in excess of the volume in the measuring chamber defined by wall means, the upper surface 72 of the enlarged base portion 10 and the outlet orifice 20, the excess liquid will be sucked back into the container when the pressure is released from the flexible walls of the container 2.

There has thus been described a preferred embodiment of a measuring and dispensing apparatus in accordance with the present invention. It should be understood by those skilled in the art that various changes and omissions in the form and detail thereof may be made therein without departing from the spirit and scope of the invention, which is to be limited only as set forth in the following claims.

What I claim as new and desire to secure by Letters Patent of the United States is:

1. A measuring and dispensing apparatus for use with a flexible-wall container, comprising:
   dispensing means having an enlarged base portion and an upstanding portion;
   wall means disposed around said dispensing means, said wall means and enlarged base portion of said dispensing means forming a fluid measuring chamber positioned above the flexible-wall container when said dispensing means is in operable engagement with said flexible-wall container, said chamber having an upper end having a fluid outlet;
   said upstanding portion having an upper end above said base portion of said dispensing means and within the walls of said fluid measuring chamber and a lower end, said lower end disposed on said enlarged base portion, said upstanding portion also having a bore therein and an outlet orifice disposed therein proximate said upper end at an angle offset from the axis of said bore and in fluid communication with said bore;
   said enlarged base portion having a container engaging means thereon; and
   tube means having an inlet end and an outlet end, said tube means disposed such that said outlet end is disposed in the bore in said upstanding portion of said dispensing means and in fluid communication therewith, said inlet end adapted to be disposed in the flexible-wall container.

2. A measuring and dispensing apparatus for use with a flexible-wall container as defined in claim 1, additionally comprising:
   sealing means disposed between the outer surface of said enlarged base portion and the inner surface of said wall means to provide a fluid-tight seal therebetween.

3. A measuring and dispensing apparatus for use with a flexible-wall container as defined in claim 1, wherein said wall means comprises an upper section and a lower section, said lower section being integral with said enlarged base portion and said upper section being attached to said lower section.

4. A measuring and dispensing apparatus for use with a flexible-wall container as defined in claim 1, wherein said enlarged base portion additionally comprises an anular shoulder disposed around at least a portion of the outer surface of said enlarged base portion for positively locating the bottom edge of said wall means.

5. A measuring and dispensing apparatus for use with a flexible-wall container as defined in claim 1, wherein said upstanding portion of said dispensing means additionally comprises a bore having at least two tube means receiving stops therein, one of said tube means receiving stops being adapted to receive a larger diameter tube means than the other of said tube means receiving stops.

6. A measuring and dispensing apparatus for use with a flexible-wall container as defined in claim 1, wherein said enlarged base portion has a plurality of separate segments disposed on the outer surface thereof and wherein said wall means has an equal number of segment receiving grooves disposed on the inner surface thereof proximate the lower end of said wall means for receiving said segments whereby said wall means are prevented from rotating with regard to said enlarged base portion.

7. A measuring and dispensing apparatus for use with a flexible-wall container, comprising:
   dispensing means having a base portion and an upstanding portion;
   wall means disposed around said dispensing means, said wall means and base portion of said dispensing means forming a fluid measuring chamber positioned above the flexible-wall container when said dispensing means is in operable engagement with said flexible-wall container, said chamber having an upper end having a fluid outlet;
   said upstanding portion having an upper end above said base portion of said dispensing means and within the walls of said fluid measuring chamber and a lower end, said lower end disposed on said base portion, said upstanding portion also having a bore therein and an outlet orifice disposed therein proximate said upper end at an angle offset from the axis of said bore and in fluid communication with said bore;
   said base portion having a container engaging means thereon; and
   tube means having an inlet end and an outlet end, said tube means disposed such that said outlet end is disposed in the bore in said upstanding portion of said dispensing means and in fluid communication therewith, said inlet end adapted to be disposed in the flexible-wall container.

* * * * *